United States Patent
Nikola et al.

(10) Patent No.: US 11,047,427 B2
(45) Date of Patent: Jun. 29, 2021

(54) DISK, DISK CLUTCH WITH SUCH A DISK, DOUBLE CLUTCH DEVICE WITH SUCH A DISK CLUTCH, AND METHOD FOR PRODUCING A DISK

(71) Applicants: BorgWarner Inc., Auburn Hills, MI (US); Dr. Ing. H.c.F. Porsche Aktiengesellschaft, Stuttgart (DE); ZF Friedrichshafen AG, Friedrichshafen (DE)

(72) Inventors: Patrick Carsten Nikola, Mannheim (DE); Martin Gerlach, Neulussheim (DE); Jochen Alois Rudoff Seufert, Brühl (DE); Christian Bernhard Halm, Walldorf (DE); Michael Obergasser, Friedrichshafen (DE); Alen Pelzer, Tettnang/Kau (DE); Wolfgang Reisser, Rutesheim (DE); Arne Krueger, Karlsruhe (DE); Steffen Winterhalder, Ditzingen (DE); Dirk Oliver Lautenschlager, Ostfildern (DE); Michael Funk, Stuttgart (DE); Gerd Bofinger, Vaihingen/Enz. (DE)

(73) Assignees: BorgWarner Inc., Auburn Hills, MI (US); Dr. Ing. H.c.F. Porsche Aktiengesellschaft, Stuttgart (DE); ZF Friedrichshafen AG, Friedrichshafen (DE)

( * ) Notice: Subject to any disclaimer, the term of this patent is extended or adjusted under 35 U.S.C. 154(b) by 282 days.

(21) Appl. No.: 15/914,476

(22) Filed: Mar. 7, 2018

(65) Prior Publication Data
US 2018/0259005 A1 Sep. 13, 2018

(30) Foreign Application Priority Data
Mar. 8, 2017 (DE) .......................... 102017002231.3

(51) Int. Cl.
*F16D 13/64* (2006.01)
*F16D 13/68* (2006.01)
(Continued)

(52) U.S. Cl.
CPC ......... *F16D 13/644* (2013.01); *F16D 13/385* (2013.01); *F16D 13/68* (2013.01);
(Continued)

(58) Field of Classification Search
CPC ...... F16D 13/64; F16D 13/644; F16D 13/646; F16D 13/648; F16D 13/52; F16D 13/68;
(Continued)

(56) References Cited

U.S. PATENT DOCUMENTS 5,029,686 A * 7/1991 Yesnik .................. F16D 13/648
192/70.14
9,410,583 B2 8/2016 Tsioptsias et al.
(Continued)

FOREIGN PATENT DOCUMENTS

| DE | 1024758 B | 2/1958 |
| DE | 202007009839 U1 | 11/2008 |
| EP | 2460896 A1 | 6/2012 |
| IE | 102011120811 A1 | 6/2013 |
| WO | WO2016057263 | * 4/2016 |

OTHER PUBLICATIONS

Machine-assisted English translation for DE 1 024 758 extracted from espacenet.com database on Mar. 15, 2018, 3 pages.
(Continued)

*Primary Examiner* — Charles A Fox
*Assistant Examiner* — Ryan P Dodd
(74) *Attorney, Agent, or Firm* — Howard & Howard Attorneys PLLC

(57) ABSTRACT

The disclosure relates to a disk (38) for a disk clutch (26) comprising an annular base element (76) which has a toothing (78) with multiple teeth (80) for achieving a rotary driving engagement with a disk carrier (34), wherein the
(Continued)

base element (76) has at least one hardened region (96) in which the base element (76) is designed as harder than in the tooth flank regions (98, 100) of the teeth (80). In addition, the disclosure relates to a disk clutch (26) with such a disk (38), a double clutch device (2) with such a disk clutch (26), and a method for producing such a disk (38).

10 Claims, 3 Drawing Sheets

(51) Int. Cl.
| | | |
|---|---|---|
| *F16D 13/38* | (2006.01) | |
| *F16D 21/06* | (2006.01) | |
| *F16D 13/52* | (2006.01) | |
| *F16D 25/0638* | (2006.01) | |

(52) U.S. Cl.
CPC ............ *F16D 13/683* (2013.01); *F16D 13/52* (2013.01); *F16D 13/64* (2013.01); *F16D 13/646* (2013.01); *F16D 21/06* (2013.01); *F16D 25/0638* (2013.01); *F16D 2200/0021* (2013.01); *F16D 2250/0053* (2013.01)

(58) Field of Classification Search
CPC ... F16D 13/683; F16D 13/385; F16D 25/0638
See application file for complete search history.

(56) References Cited

U.S. PATENT DOCUMENTS

| | | | | |
|---|---|---|---|---|
| 10,352,375 | B2* | 7/2019 | Buchanan | F16D 69/00 |
| 2009/0321210 | A1* | 12/2009 | Tung | F16D 13/648 192/70.14 |
| 2013/0186715 | A1* | 7/2013 | Monroe | F16D 55/36 188/71.5 |
| 2015/0369301 | A1* | 12/2015 | Tagashira | C22C 38/54 148/546 |
| 2016/0025155 | A1* | 1/2016 | Tohyama | F16D 13/648 192/107 C |
| 2016/0102717 | A1* | 4/2016 | Arhab | F16D 13/385 192/48.1 |

OTHER PUBLICATIONS

Machine-assisted English translation for DE 20 2007 009 839 extracted from espacenet.com database on Mar. 15, 2018, 11 pages.
English language abstract for EP 2 460 896 extracted from espacenet.com database on Mar. 15, 2018, 1 page.
English language abstract and machine-assisted English translation for DE 10 2011 120 811 extracted from espacenet.com database on Mar. 15 2018, 16 pages.

* cited by examiner

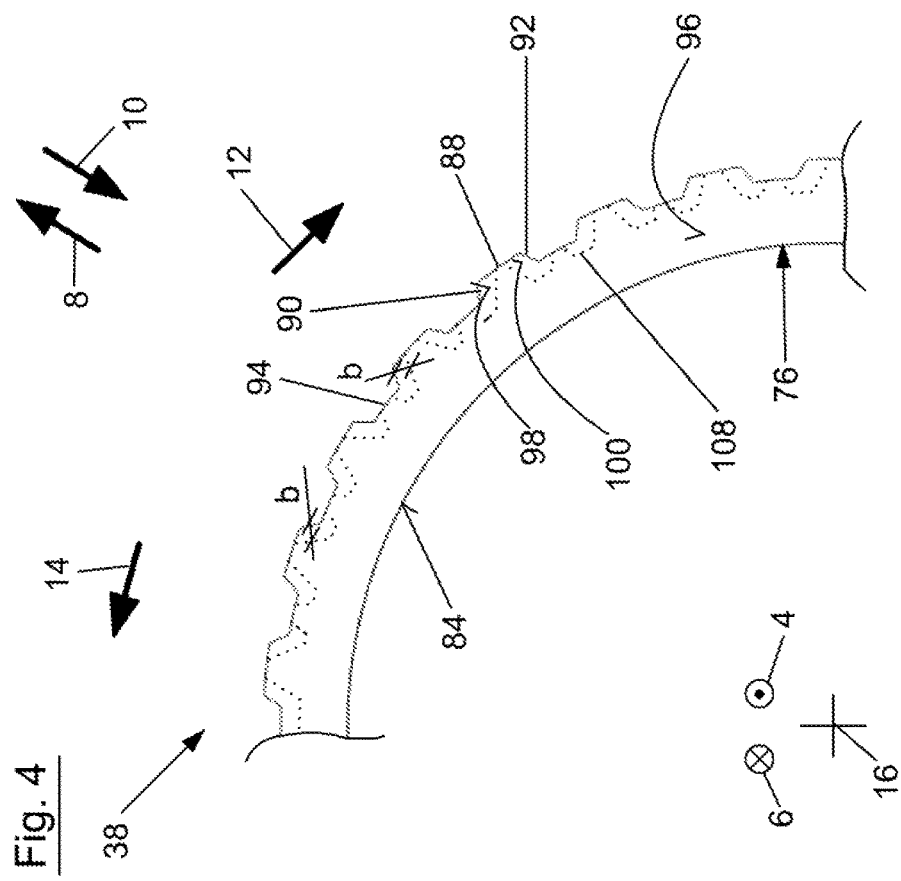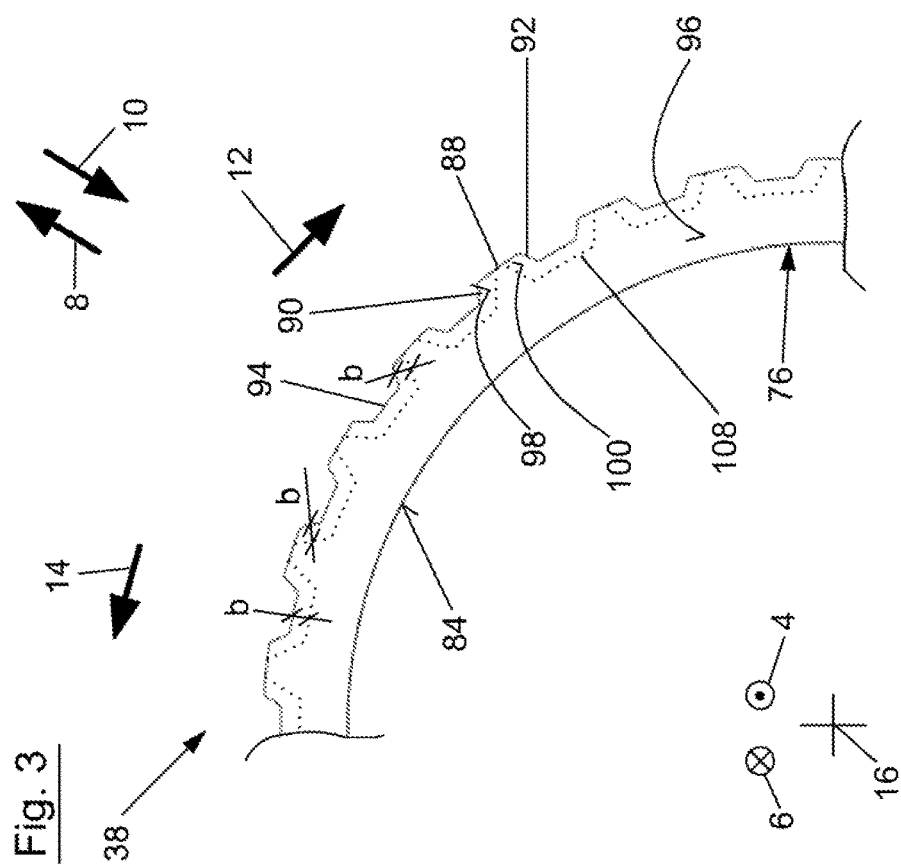

DISK, DISK CLUTCH WITH SUCH A DISK, DOUBLE CLUTCH DEVICE WITH SUCH A DISK CLUTCH, AND METHOD FOR PRODUCING A DISK

CROSS-REFERENCE TO RELATED APPLICATIONS

This application claims the benefit of German Patent Application No. 102017002231.3 filed Mar. 8, 2017, the disclosure of which is herein incorporated by reference in its entirety.

FIELD OF THE DISCLOSURE

The present invention relates to a disk for a disk clutch comprising an annular base element which has a toothing with multiple teeth for achieving a rotary driving engagement with a disk carrier. In addition, the present invention relates to a disk clutch with such a disk, and a double clutch device with such a disk clutch. In addition, the present invention relates to a method for producing such a disk.

BACKGROUND

Disk clutches that have a compressible disk sets are known from the prior art. The disk set is generally made from first disks, which are connected to a first disk carrier to be rotationally fixed yet axially displaceable, and second disks, which are connected to a second disk carrier to be rotationally fixed yet axially displaceable, wherein the first and second disks follow alternatingly in order to be able to be brought into frictional engagement. While the first disks are designed as friction lining disks, which have a friction lining carrier with friction linings applied on both sides, the second disks are designed as metal or steel disks without friction linings. In order to counteract wear on the metal or steel disks without friction linings, the metal or steel disks are hardened in practice, for example, using a corresponding heat treatment, wherein it has been shown that noise generated during operation of the disk clutch may additionally be counteracted by this means. Thus, the use of hardened metal or steel disks in disk clutches has been proven; however, the disadvantage is that the components of the disk clutch that interact with the correspondingly hardened metal or steel disks, in particular the disk carrier that contacts the metal or steel disks via the toothing thereof, must be designed to be correspondingly hard or be hardened in order to counteract wear on the disk carrier. Consequently, the hardened metal or steel disks cause increased manufacturing expenses, design expenses, and finally correspondingly increased costs as well.

SUMMARY OF THE DISCLOSURE AND ADVANTAGES

It is therefore an object of the present invention to create a disk for a disk clutch comprising an annular base element which has a toothing, said disk being wear-resistant and being suited for counteracting noise within the disk clutch, and also may be used in a disk clutch at low manufacturing expenses, design expenses and costs. In addition, the underlying object of the present invention is to create a low-noise, wear-resistant, and easily assembled disk clutch with at least one such disk. Furthermore, the underlying object of the present invention is to create a double clutch device with at least one such disk clutch. Furthermore, the underlying object of the present invention is to provide an advantageous method for producing such a disk.

This problem is solved by the features listed in Patent Claims 1, 8, 9, or 10. Advantageous embodiments of the invention are the subject matter of the subclaims.

The disk according to the invention is designed for use in a disk clutch. The disk has an annular base element, wherein the base element has a toothing with multiple teeth for achieving a rotary driving engagement with a disk carrier. The toothing of the annular base element may, for example, be an external toothing for rotary driving engagement with an outer disk carrier or an internal toothing for rotary driving engagement with an inner disk carrier. The annular base element is preferably designed as one piece with the toothing. In addition, the annular base element is preferably manufactured from metal or steel. The annular base element has at least one hardened region in which the base element is designed to be harder than in the tooth flank regions of the teeth of the toothing. Thus, the hardened region may, for example, be a heat-treated region. The hardness of the hardened region is thereby preferably greater than the hardness of the base material of the base element, which material also forms the toothing. While the annular base element has the at least one hardened area, the disk is designed to be particularly wear-resistant in these areas, which leads to lower noise when used inside of a disk clutch. The tooth flank regions of the teeth of the toothing, which are designed as softer than the at least one hardened region, also have the advantage that no increased demands with respect to hardness are placed on the disk carrier, which interacts with the disks in the tooth flank areas, in order to prevent wear in the contact region between the tooth flanks of the disk and the disk carrier. Instead, the disk carrier may have the same hardness as the tooth flank regions of the disks without its base material needing to be additionally hardened.

In one preferred embodiment of the disk according to the invention, the hardened region of the base element is arranged at a distance to the tooth flanks of the teeth. By this means, potential wear on the disk carrier assigned to the disk should be counteracted particularly effectively in the installed state of the disk within a disk clutch. The distance of the hardened region to the tooth flanks of the teeth take into account the fact that a material influence occurs beyond the boundary of the hardened region, depending on the respective method selected for hardening the hardened region, and said influence may result in hardening—even to a lesser extent—of the material beyond the boundary of the hardened region. In this context, it has proven particularly advantageous if said distance between the hardened region—thus in particular the region processed for the purpose of hardening—and the tooth flanks of the teeth is at least 3 mm, in order to ensure relatively soft tooth flanks of the teeth and thus lower wear on the assigned disk carrier.

In another preferred embodiment of the disk according to the invention, the hardened region is arranged at a distance to the tooth roots of the teeth of the toothing in order to particularly reliably prevent an undesired hardening of the tooth flank regions during the hardening of the hardened region. In this embodiment, it has also proven particularly advantageous if the distance between the hardened region—thus in particular the region processed for the purpose of hardening—and the tooth roots of the teeth is at least 3 mm, in order to ensure relatively soft design of the tooth flank regions.

In one advantageous embodiment of the disk according to the invention, which is preferably based on the previously described embodiment, the teeth of the toothing are hardened in order to achieve a lower hardness than in the hardened region, or are unhardened in contrast to the hardened region. In other words, the teeth in this embodiment are not, for example, hardened like the hardened region, but instead have merely the hardness of the base material of the base element to ensure relatively soft tooth flank regions of the teeth. This type of disk is relatively easily producible, particularly as—in the preferred method described later in more detail—a complete omission of the teeth of the disk-shaped base element may be carried out relatively easily and reliably during hardening of the hardened region.

In another advantageous embodiment of the disk according to the invention, the hardened region is designed extending in the circumferential direction on a front side and/or on a back side of the base element. It is hereby preferred if the hardened region is designed as continuous in the circumferential direction on the front side and/or on the back side of the base element. It has also proven advantageous in this embodiment if the hardened region completely comprises that region of the base element which may ultimately be brought into frictional engagement with an adjacent disk or friction lining disk.

In one particularly advantageous embodiment of the disk according to the invention, the hardened region extending in the circumferential direction extends on the front and/or back side in the radial direction up to a delimiting circle which delimits the hardened region, thus in particular the region processed for the purpose of hardening, of the base element. The toothing thereby follows the delimitation circle in the same radial direction. It is additionally preferred in this embodiment if the delimitation circle is arranged in the same radial direction at a distance to a tooth root circle of the teeth in order to not only delimit the hardened area relatively exactly, but also to prevent an undesired hardening of the tooth flank regions of the teeth and the tooth roots of the teeth. Thus, a distance of at least 1 mm has already proven advantageous, particularly as the tooth flank regions remain largely uninfluenced, in particular during hardening by nitriding. In addition, in this embodiment, a distance of at least 3 mm between the delimitation circle and the tooth root circle has proven advantageous in order to ensure relatively soft tooth flank regions of the teeth.

To achieve a particularly compact design of the disks and a relatively large hardened region to enable the achievement of wear resistance and prevention of noises, the previously mentioned distance between the delimitation circle and the tooth root circle is a maximum of 5 mm. It is hereby preferred if the distance between the delimitation circle and the tooth root circle is a maximum of 4 mm, particularly preferably a maximum of 3.5 mm, in order to achieve a large hardened region on the one hand and yet relatively uninfluenced, soft tooth flank regions on the other. Thus, in this embodiment in particular, a relatively low width of the annular base element may be achieved in the radial direction and simultaneously a largely or complete coverage is achieved of that region of the base element by the hardened region which may be brought into frictional engagement with an adjacent disk of the disk clutch.

In another advantageous embodiment of the disk according to the invention, the toothing of the annular base element is designed as an external toothing which is suitable for achieving a rotary driving engagement with an outer disk carrier.

As already indicated previously, the base element is manufactured from metal or steel or it is made from metal or steel in another advantageous embodiment of the disk according to the invention.

Basically, the disks might also be designed as friction lining disks, in which the annular base element forms a friction lining carrier on whose front and/or back side a friction lining is arranged or fixed. Consequently, the disk might thereby be designed as a friction lining disk provided with a friction lining on one or both sides. However, in a friction lining disk provided with friction linings on both sides, the advantages achieved by the hardened regions are small. However, in a friction lining disk provided with a friction lining on one side, the advantage according to the invention is provided in particular if the hardened region is provided on the side of the annular base element facing away from the friction lining side. In one particularly advantageous embodiment of the disk according to the invention, it is preferred, however, if the disk is designed as a disk without a friction lining and/or as a steel disk.

Basically, the hardened region of the annular base element might be hardened using any method. However, to be able to achieve a particularly reliable delimitation of the hardened region with respect to the relatively soft tooth flank regions, and in particular to prevent an undesired, at least partial hardening of the tooth flank regions, the base element is surface hardened in the hardened region in an another particularly preferred embodiment of the disk according to the invention.

With regard to a surface hardening in the at least one hardened region of the base element, nitriding or nitrocarburizing of the hardened region has proven particularly advantageous to effect the surface hardening by enriching the surface layer of the annular base element. So-called salt bath nitriding or salt bath nitrocarburizing has, however, proven disadvantageous or even impossible, particularly as an effective and reliable limitation of the hardened region is not implementable with respect to the tooth flank regions of the teeth. Thus, in an annular base element with an internal toothing, there would indeed be the possibility of immersing the radially outer region of the annular base element in the salt bath and achieving a hardened region through rotation of the annular base element, said region extending in the circumferential direction, yet not extending up to the teeth or their tooth flank regions; however, the distance of the hardened region with respect to the tooth flank region or the tooth flanks may scarcely be reliably set due to the turbulent salt bath. Generating a hardened region on a base element with an external toothing is absolutely impossible in the context of salt bath nitriding or salt bath nitrocarburizing, particularly as the teeth of the toothing would always have to be immersed in the salt bath. Due to the previously listed reasons, in another particularly preferred embodiment of the disk according to the invention, the base element is surface hardened in the hardened region by gas nitriding or gas carburizing [sic] or by plasma nitriding or plasma nitrocarburizing. Thus, the tooth flank regions, if necessary also the teeth and/or the region between the delimitation circle and the tooth root circle, may be covered, for example, by a special paste during the gas nitriding or gas nitrocarburizing to achieve a reliable and exact delimitation of the hardened region and thus relatively soft tooth flank regions of the teeth. While the application of such a paste does indeed facilitate a reliable delimitation of the hardened region, it is still associated with a higher manufacturing expense; however, it is particularly preferred in this embodiment if the base element is surface hardened in the hardened region using plasma nitriding or plasma nitrocarburizing. Due to the plasma nitriding or plasma nitrocarburizing, a particularly reliable and exact delimitation of the hardened region is possible with respect to the tooth flank region, if necessary, to the teeth, and the region between the delimitation circle and the tooth root circle of the tooth, which may be achieved, e.g. by a cover part, for example, a cover ring or a stencil without having to apply a paste as in gas nitriding or gas nitrocarburizing.

The disk clutch according to the invention has at least one disk of the type according to the invention. In this case, preferably two or more, particularly preferably, all disks of a multi-disk set, which is in rotary driving connection with one of the two disk carriers, is designed as disks of the type according to the invention.

In one advantageous embodiment of the disk clutch according to the invention, the disk is in rotary driving engagement with a disk carrier via the toothing of the annular base element. The rotary driving engagement is hereby preferably configured in such a way that there is a rotary driving connection, yet the disk is displaceable in an axial direction relative to the disk carrier. The disk carrier is designed to be softer at least in a contact region with the toothing than the base element in the hardened region, and/or the disk carrier has essentially the same hardness at least in the contact region as the tooth flank regions of the teeth.

In one particularly advantageous embodiment of the disk clutch according to the invention, the disk carrier is not hardened at least in the contact region with the toothing of the annular base element, and/or is not designed as nitrided or nitrocarburized.

The double clutch device according to the invention is conceived of for arrangement in a drivetrain between a drive unit and a transmission. The double clutch device has a first disk clutch assigned to a first transmission input shaft for selective torque transmission between the drive unit and the first transmission input shaft, and a second disk clutch assigned to a second transmission input shaft for selective torque transmission between the drive unit and the second transmission input shaft. The first and/or second disk clutch is thereby designed as a disk clutch of the type according to the invention, which consequently has a disk of the type according to the invention.

In one preferred embodiment of the double clutch device according to the invention, preferably only one of the two disk clutches, thus the first or the second disk clutch, is designed as a disk clutch of the type according to the invention. The underlying knowledge of this embodiment is that the noise in a double clutch device is primarily increased only by one of the two disk clutches during operation. Consequently, in this embodiment, the manufacturing expenses and the noise of the double clutch device may be significantly reduced by the use of only one disk clutch of the type according to the invention, particularly as the other of the two disk clutches may be designed as a conventional disk clutch, in particular as a disk clutch without hardened disks, thus, for example, disks that are not nitrided or nitrocarburized.

In one particularly preferred embodiment of the double clutch device according to the invention, the double clutch device is designed as a concentric double clutch device in which the first disk clutch radially surrounds the second disk clutch on the outside, wherein only the first disk clutch, consequently the radially outer disk clutch, is designed as a disk clutch according to the invention with at least one disk of the type according to the invention. It has been shown that in a concentric double clutch, an outer disk clutch in the form of a disk clutch of the inventive type already alleviates the majority of the noise, without having to also design the radially inner disk clutch as the type of the inventive disk clutch. Also, the hardened regions on the disks of the radially outer disk clutch may already be generated relatively easily based on the larger diameter of these disks and reliably delimited with respect to the softer regions. Consequently, a concentric double clutch device is created with this embodiment which operates particularly quietly at low manufacturing expense.

The method according to the invention for producing a disk for a disk clutch has the method steps: providing an annular base element that has a toothing with multiple teeth; covering at least the tooth flank regions of the toothing; and surface hardening the base element using gas nitriding or gas nitrocarburizing or using plasma nitriding or plasma nitrocarburizing to create at least one hardened region, in which the base element is designed to be harder than in the tooth flank regions of the toothing.

In one advantageous embodiment of the method according to the invention, an annular base element is provided whose toothing is designed as an external toothing.

In one preferred embodiment of the method according to the invention, the teeth of the toothing are completely covered, wherein it is additionally preferred in this embodiment if the covering is carried out to create a covered safety margin between the teeth and a non-covered region of the base element in order to achieve, for example, the distance between the delimitation circle and the tooth root circle of the teeth previously described with reference to the disk according to the invention. In this embodiment, it is additionally preferred if the covering of the teeth and/or the safety margin between the teeth and a non-covered region of the base element is carried out by means of an annular or annular disk shaped cover part or a stencil, which should be used, in particular during plasma nitriding or plasma nitrocarburizing to reliably delimit the hardened regions to be generated from the other regions of the base element.

In another preferred embodiment of the method according to the invention, the hardened region is generated by gas nitriding or gas nitrocarburizing or by plasma nitriding or plasma nitrocarburizing to create a hardened region, in which the base element is designed to be harder than in the region of the teeth and/or is designed to be harder than in the region of the teeth and the safety margin.

BRIEF DESCRIPTION OF THE DRAWINGS

The invention will subsequently be explained in more detail by means of exemplary embodiments with reference to the accompanying drawings. As shown in.

DETAILED DESCRIPTION OF THE DISCLOSURE

Figure 1:
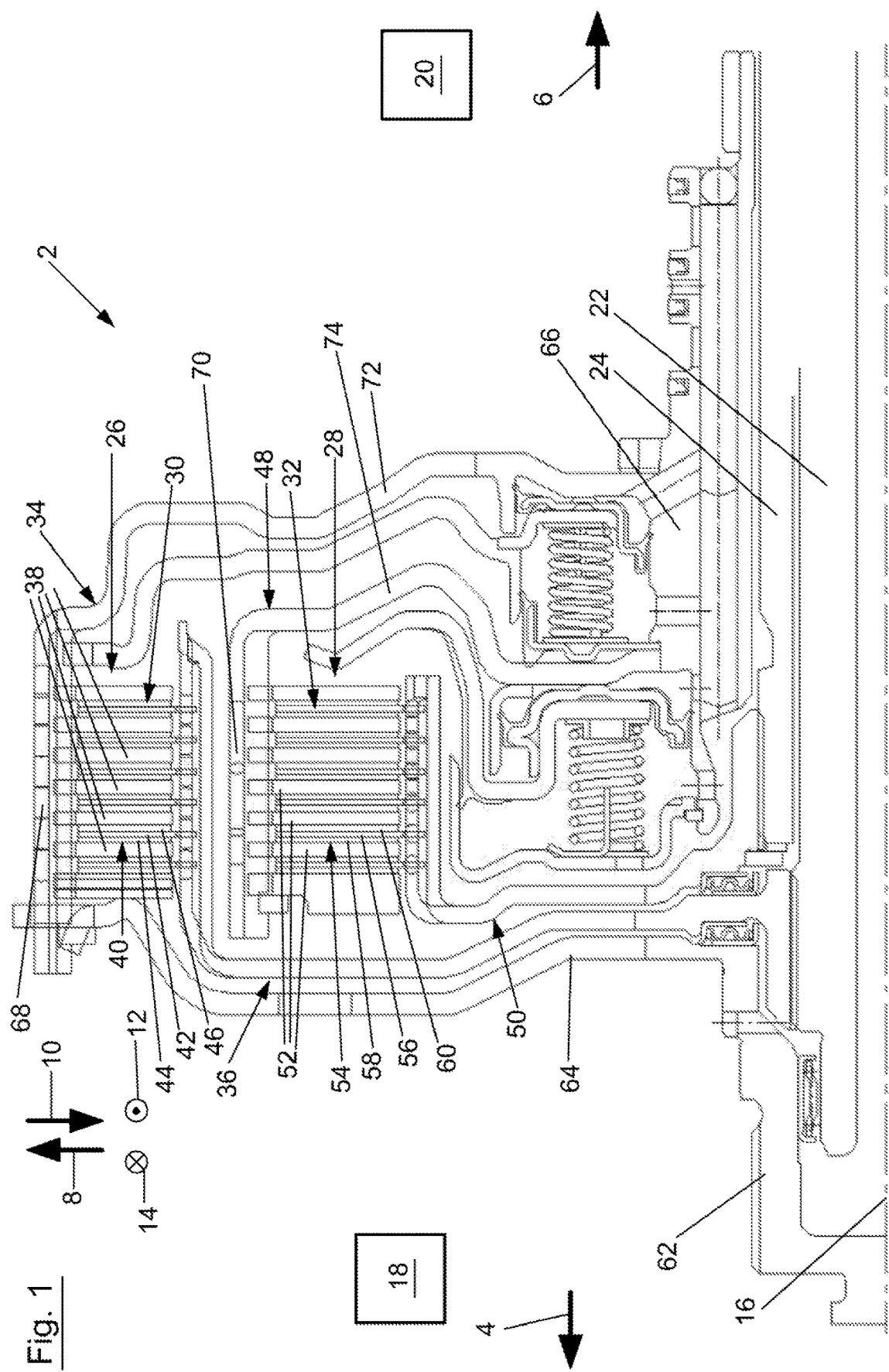
FIG. 1 a partial side view of a double clutch device with a first and a second disk clutch in a cutaway view, FIG. 2 a front view of a disk from the first disk clutch from FIG. 1 in a first embodiment variant, FIG. 3 a partial front view of the disk from the first disk clutch from FIG. 1 in a second embodiment variant, and FIG. 4 a partial front view of the disk from FIG. 1 in a third embodiment variant.

FIG. 1 shows a double clutch device 2. In FIG. 1, opposite axial directions 4, 6, opposite radial directions 8, 10, and opposite circumferential directions 12, 14 of double clutch device 2 are indicated by means of corresponding arrows, wherein double clutch device 2 is rotatable about an axis of rotation 16 which extends in axial directions 4, 6.

Double clutch device 2 is arranged in axial directions 4, 6 between a drive unit 18, thus, for example, an internal combustion engine, and a transmission 20, which are essentially schematically indicated in FIG. 1, wherein a first transmission input shaft 22 and a second transmission input shaft 24 are also indicated for transmission 20, of the two, first transmission input shaft 22 extends in axial direction 4, 6 through second transmission input shaft 24, which is designed as a hollow shaft for this purpose.

Double clutch device 2 has a first disk clutch 26 and a second disk clutch 28, wherein double clutch device 2 is designed as a concentric double clutch device 2 so that first disk clutch 26 or its disk set 30 surrounds second disk clutch 28 or its disk set 32 outwardly in radial direction 8, and first disk clutch 26 may be called the radially outer disk clutch and second disk clutch 28 may be called the radially inner disk clutch.

First disk clutch 26 has a first disk carrier 34, in this case an input side outer disk carrier, and a second disk carrier 36, in this case an output side inner disk carrier, which are assigned to disk set 30 of first disk clutch 26. Thus, disk set 30 has first disks 38, in this case outer disks, which are in rotary driving engagement with first disk carrier 34, however, are displaceable relative to the same in axial direction 4, 6, and second disks 40, in this case inner disks, which are in rotary driving engagement with second disk carrier 36, however, are likewise displaceable in axial direction 4, 6 relative to second disk carrier 36. First disks 38 are thereby arranged alternating with second disks 40 in axial direction 4, 6, wherein first disks 38 are designed as disks 38 without friction linings, while second disks 40 are designed as friction lining disks which are essentially composed from a friction lining carrier 42 and friction linings 44, 46 fixed on both sides on friction lining carrier 42.

Correspondingly, second disk clutch 28 also has a first disk carrier 48 designed as an outer disk carrier which functions as the input side, a second disk carrier 50 designed as an inner disk carrier which functions as the output side, and disk set 32 composed of first and second disks 52, 54, of which first disks 52 are designed as outer disks without friction linings and second disks 54 are designed as friction lining disks with friction lining carrier 56 and friction linings 58, 60.

As is clear from FIG. 1, first disk clutch 26 functions for selective torque transmission between drive unit 18 and first transmission input shaft 22 of transmission 20, while second disk clutch 28 functions for selective torque transmission between drive unit 18 and second transmission input shaft 24. For this purpose, double clutch device 2 has a clutch input hub 62, which is in rotary driving connection with first disk carrier 34 of first disk clutch 26 via a drive plate 64. First disk carrier 34 of first disk clutch 26 is additionally connected rotationally fixed to a clutch hub 66, to which first disk carrier 48 of second disk clutch 28 is also connected rotationally fixed, wherein clutch hub 66 functions to support double clutch device 2 in radial direction 8, 10 on a housing of transmission 20, not shown in greater detail. The two disk clutches 26, 28 are hydraulically actuatable and/or designed as wet-running.

The two first disk carriers 34, 48 of the two disk clutches 26, 28 are designed as shaped sheet metal parts, wherein these each have an essentially tubular disk support section 68, 70 extending in axial directions 4, 6 with a rotary driving contour for achieving a rotary driving engagement with first disks 38 or 52 and a support section 72 or 74 extending in axial direction 6 to disk support section 68, 70 and up to clutch hub 66 in radial direction 10. Support sections 72, 74 are connected inward in radial direction 10—as previously mentioned—to clutch hub 66 in a rotationally fixed way, wherein support sections 72, 74 are preferably welded to clutch hub 66.

Figure 2:
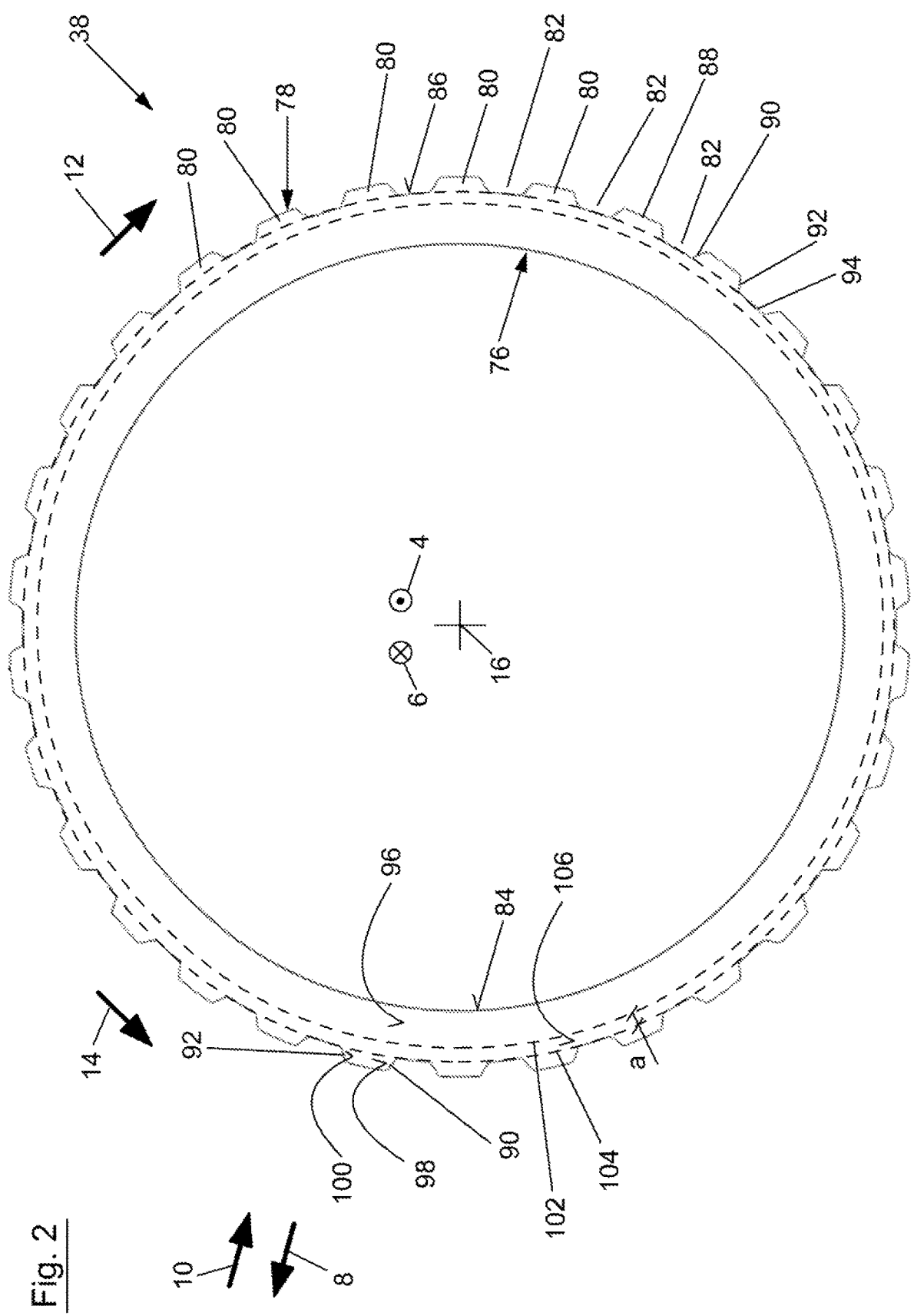

FIG. 2 shows a front view of one of first disks 38 of first disk clutch 26, wherein the subsequent description of first disk 38 applies equally for all first disks 38 of first disk clutch 26. Disk 38 has an annular base element 76 which has a toothing 78 with multiple teeth 80 for achieving a rotary driving engagement with first disk carrier 34, stated more precisely, with disk support section 68 of first disk carrier 34. Toothing 78 is designed as an external toothing with teeth 80 projecting outward in radial direction 8, wherein teeth 80 are arranged following one another in circumferential direction 12, 14 to form interdental spaces 82, wherein a uniform distribution of teeth 80 on annular base element 76 in circumferential direction 12, 14 is preferred. Teeth 80 are preferably designed as one piece with annular base element 76. Annular base element 76 is manufactured from metal or steel or is made from metal or steel so that disks 38 may also be designated as metal or steel disks.

Annular base element 76 has an inside edge 84 facing inward in radial direction 10 and an outside edge 86 facing outward in radial direction 8, wherein inside edge 84 is essentially designed as a circular shape, while outside edge 86 is formed by tooth tips 88 and tooth flanks 90, 92 of teeth 80 and bottoms 94 of interdental spaces 82.

Base element 76 has a hardened region 96 on the side facing in axial direction 4, wherein hardened region 96 is surface hardened and thus may also be designated as surface hardened region 96. Hardened region 96 is surface hardened using gas nitriding or gas nitrocarburizing or, particularly preferably, using plasma nitriding or plasma nitrocarburizing. Base element 76 is thereby designed to be harder in hardened region 96 than in the tooth flank regions 98, 100 assigned to tooth flanks 90, 92 of teeth 80.

In the first embodiment variant according to FIG. 2, hardened region 96 is designed as continuously extending in circumferential direction 12, 14 on the front side of base element 76 facing in axial direction 4. Hardened region 96 thereby extends inward in radial direction 10 up to inside edge 84 of annular base element 76 and outward in radial direction 8 up to delimitation circle 102, indicated by a dashed line. Delimitation circle 102 is arranged preferably concentric to axis of rotation 16 of base element 76. Delimitation circle 102 is arranged at a distance a to a tooth root circle 104 of teeth 80, indicated by a dashed line in the same outward radial direction 8, wherein tooth root circle 104 and delimitation circle 102 are preferably arranged concentric to one another. Tooth root circle 104 consequently has a greater radius that delimitation circle 102, wherein the radius of tooth root circle 104 is greater by distance a, which is at least 3 mm. Due to this distance a, an annular safety margin 106 is created between delimitation circle 102 and tooth root circle 104, said safety margin may indeed by influenced in its material properties by the targeted surface hardening of hardened region 96; however, due to minimum distance a of 3 mm, it ensures that tooth flank regions 98, 100 are largely uninfluenced, and are thus designed as correspondingly soft to be able to interact with first disk carrier 34 without wear. The surface hardening of hardened region 96 using gas nitriding or gas nitrocarburizing, in particular using plasma nitriding or plasma nitrocarburizing, has the advantage hereby that the influencing of safety margin 106 is relatively low, so that distance a does not have to significantly exceed said minimum distance of 3 mm. Thus, in said method for hardening the surface, is has proven sufficient if distance a between delimitation circle 102 and tooth root circle 104 is a maximum of 5 mm, preferably a maximum of 4 mm, particularly preferably a maximum of 3.5 mm in order to situate hardened region 96 with its advantages relatively close to teeth 80 without thereby negatively influencing tooth flank regions 98, 100. Thus, a particularly compact structure is achieved by this means for annular base element 76 and disk 38 formed therefrom. In the first embodiment variant according to FIG. 2, teeth 80 are designed as unhardened in contrast to hardened region 96 or are designed as hardened to achieve a lower hardness than in hardened region 96. Thus, teeth 80 may, for example, simply have the height of the base material of base element 76.

One embodiment variant deviating from the first embodiment variant from FIG. 2 is depicted in FIG. 3, wherein subsequently only the differences from the first embodiment variant will be discussed: identical reference numerals are used for identical or similar parts and otherwise the previous description correspondingly applies.

In contrast to the first embodiment variant according to FIG. 2, hardened region 96 is formed at least partially also in the area of teeth 80, so that hardened region 96 is no longer outwardly delimited in radial direction 8 as a circular shape, but instead by the delimitation line 108 indicated in FIG. 3 by a dotted line. Delimitation line 108 is thereby selected in such a way that hardened region 96 is arranged at a distance b to tooth flanks 90, 92 of teeth 80, wherein distance b is at least 3 mm. This distance b is also provided to bottoms 94 of interdental spaces 82 in the second embodiment variant according to FIG. 3. By maintaining said distances b from tooth flanks 90, 92 and bottoms 94 of interdental spaces 82, hardened region 96 may, however, extend through up to tooth tips 88 of teeth 80 in order to achieve a greatest hardening with the known advantages.

FIG. 4 shows a third embodiment variant of disk 38, which essentially corresponds to the second embodiment variant according to FIG. 3, so that subsequently only the differences shall be addressed; identical reference numerals are used for identical or similar parts and otherwise the previous description correspondingly applies.

In contrast to the second embodiment variant according to FIG. 3, hardened region 96 is only arranged in a minimum distance b with respect to tooth flanks 90, however, no longer at a distance with respect to bottoms 94 of interdental spaces 82, so that hardened region 96 may also extend up to bottoms 94 of interdental spaces 82 as long as it thereby maintains distance b to tooth flanks 90, 92.

Regardless of the respectively selected embodiment variant according to FIGS. 2 through 4, the preceding embodiments also apply in an analogous way for the back side of annular base element 76 facing in axial direction 6. In addition, toothing 78 of annular base element 76 engages in first disk clutch 26 to achieve a rotary driving engagement into the rotary driving contour of disk support section 68 of first disk carrier 34, wherein first disk carrier 34 is, at least in a contact region with toothing 78 of disk 38, softer than base element 76 in hardened regions 96, and/or has essentially the same hardness as tooth flank regions 98, 100. It is hereby particularly preferred if first disk carrier 34 is completely unhardened or at least disk support section 68 of first disk carrier 34 is unhardened, and/or is unhardened in contrast to hardened region 96 of disks 38, and/or is not nitrided or is not nitrocarburized. In this way, disks 38 are created which are wear-resistant, counteract noise during operation of first disk clutch 26, and guarantee a low-wear interaction with first disk carrier 34 or its disk support section 68, so that first disk carrier 34 has to be unhardened, or does not have to be nitrided or nitrocarburized, which further simplifies its production, in particular its welding to clutch hub 66.

Basically, first disks 52 of second disk clutch 28 might also be designed as modified or partially hardened in the way described with reference to FIGS. 2 through 4. However, it has been shown that, for noise reduction within a double clutch device 2, one disk clutch 26; 28 with disks 38 as described already leads to a substantial noise reduction so that corresponding disks 38 do not also have to be provided in second disk clutch 28. Thereby, it is particularly preferred—as is shown in FIG. 1—if the outer disk clutch in radial direction 8, in this case first disk clutch 26, which has first disks 38 as described with reference to FIGS. 2 through 4, effects a substantial reduction of noise, while conventional metal or steel disks, which are unhardened or not nitrided or nitrocarburized, may be used as first disks 52 for the radially inner disk clutch, in this case second disk clutch 28.

Within the context of the method for producing disks 38, annular base element 76 with toothing 78, in this case external toothing 78, is initially provided. Subsequently only tooth flank regions 98, 100 (FIG. 4), tooth flank regions 98, 100 and the regions of bottoms 94 of interdental spaces 82 (FIG. 3), or teeth 80 of toothing 78 are completely covered, the latter while creating, if necessary, a covered safety margin 106 between teeth 80 and a not covered region 96 of base element 76 (FIG. 2). Finally, non-covered base element 76 is surface hardened in such a way using gas nitriding or gas nitrocarburizing or plasma nitriding or plasma nitrocarburizing, wherein this is carried out to create the at least one hardened region 96. Base element 76 is thus designed as harder in hardened region 96 than in tooth flank regions 98, 100 of toothing 78 (FIGS. 3 and 4), and harder than in the region of teeth 80 and safety margin 106 (FIG. 2), wherein safety margin 106 functions as a type of transition zone to ensure a soft design of toothing 78. While it is relatively effective for this purpose to apply pastes for covering in the context of gas nitriding or gas nitrocarburizing, these do, however, include an increased manufacturing expense; whereas quite simple and fixed covering means, stencils, or templates may be used during plasma nitriding or plasma nitrocarburizing, which additionally guarantee a particularly safe and reproducible delimitation of hardened region 96.

REFERENCE NUMERALS

2 Double clutch device
4 Axial direction
6 Axial direction
8 Radial direction
10 Radial direction
12 Circumferential direction
14 Circumferential direction
16 Axis of rotation
18 Drive unit
20 Transmission
22 First transmission input shaft
24 Second transmission input shaft
26 First disk clutch
28 Second disk clutch
30 Disk set
32 disk set
34 First disk carrier
36 Second disk carrier
38 First disks
40 Second disks 42 Friction lining carrier
44 Friction lining
46 Friction lining
48 First disk carrier
50 Second disk carrier
52 First disks
54 Second disks
56 Friction lining carrier
58 Friction lining
60 Friction lining
62 Clutch input hub
64 Drive plate
66 Clutch hub
68 Disk support section
70 Disk support section
72 Support section
74 Support section
76 Annular base element
78 Toothing
80 Teeth
82 Interdental spaces
84 Inside edge
86 Outside edge
88 Tooth tips
90 Tooth flank
92 Tooth flank
94 Bottoms
96 Hardened region
98 Tooth flank region
100 Tooth flank region
102 Delimitation circle
104 Tooth root circle
106 Safety margin
108 Delimitation line
a Distance
b Distance

The invention claimed is:

1. A disk (38) for a disk clutch (26) comprising an annular base element (76) which has a toothing (78) with multiple teeth (80) for achieving a rotary driving engagement with a disk carrier (34), characterized in that the base element (76) has at least one hardened region (96) in which the base element (76) is designed as harder than in tooth flank regions (98, 100) of the teeth (80) and characterized in that the hardened region (96) is arranged at a distance (b) to the tooth flanks (90, 92) of the teeth (80), wherein the distance (b) is at least 3 mm.

2. The disk (38) according to claim 1, characterized in that the hardened region (96) is arranged in a distance (a) to the tooth roots of the teeth (80), wherein the distance (a) is at least 3 mm.

3. The disk (38) according to claim 1, characterized in that the toothing (78) is an external toothing.

4. The disk (38) according to claim 1, characterized in that the base element (76) is surface hardened in the hardened region (96) using gas nitriding gas nitrocarburizing plasma nitriding, or plasma nitrocarburizing.

5. A disk clutch (26) with at least one disk (38) according to claim 1, wherein the disk (38) is in rotary driving engagement via the toothing (78) with a disk carrier (34), wherein the toothing (78) is softer than the base element (76) in the hardened region (96), or has the same hardness as the tooth flank region (98, 100).

6. A double clutch device (2) for arranging in a drivetrain between a drive unit (18) and a transmission (20), having a first disk clutch (26) assigned to a first transmission input shaft (22) for selective torque transmission between the drive unit (18) and the first transmission input shaft (22) and a second disk clutch (28) assigned to a second transmission input shaft (24) for selective torque transmission between the drive unit (18) and the second transmission input shaft (24), characterized in that the double clutch device (2) is designed as a concentric double clutch device (2) and only the first disk clutch (26) which is a radially outer disk clutch of the double clutch device (2) is designed as the disk clutch (26) according to claim 5.

7. A method for producing a disk (38) according claim 1 comprising the method steps:
providing an annular base element (76) which has a toothing (78) with multiple teeth (80),
covering at least the tooth flank regions (98, 100) of the toothing (78), and
surface hardening the base element (76) using gas nitriding, gas nitrocarburizing, plasma nitriding, or plasma nitrocarburizing to create at least one hardened region (96), in which the base element (76) is designed as harder than in the tooth flank regions (98, 100) of the toothing (78).

8. The disk (38) according to claim 1, characterized in that the teeth (80) are hardened to achieve a lower hardness than in the hardened region (96), or are unhardened in contrast to the hardened region (96).

9. The disk (38) according to claim 1, characterized in that the base element (76) is manufactured or made from metal or steel, and the disk (38) is designed as a disk (38) without a friction lining or is designed as a steel disk.

10. The disk clutch (26) with at least one disk (38) according to claim 5, wherein the toothing (78) is not hardened, not nitrided, and not nitrocarburized.

* * * * *

UNITED STATES PATENT AND TRADEMARK OFFICE
CERTIFICATE OF CORRECTION

| | | |
|---|---|---|
| PATENT NO. | : 11,047,427 B2 | Page 1 of 1 |
| APPLICATION NO. | : 15/914476 | |
| DATED | : June 29, 2021 | |
| INVENTOR(S) | : Patrick Carsten Nikola et al. | |

It is certified that error appears in the above-identified patent and that said Letters Patent is hereby corrected as shown below:

On the Title Page

Item (73), Line 1, delete "BorgWamer Inc." and replace with -- BorgWarner Inc. --

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*